United States Patent
Cavalli (10) Patent No.: US 9,455,460 B2
(45) Date of Patent: Sep. 27, 2016

(54) METHOD OF CONTROLLING AND MAXIMIZING THE ELECTRIC EFFICIENCY AND THE POWER OUTPUT OF A FUEL CELL

(75) Inventor: Stefano Cavalli, Peschiera del Garda (IT)

(73) Assignee: Genio, S.R.L., Milan (IT)

( * ) Notice: Subject to any disclaimer, the term of this patent is extended or adjusted under 35 U.S.C. 154(b) by 413 days.

(21) Appl. No.: 14/118,835

(22) PCT Filed: May 21, 2012

(86) PCT No.: PCT/IB2012/052541
§ 371 (c)(1),
(2), (4) Date: Feb. 14, 2014

(87) PCT Pub. No.: WO2012/156957
PCT Pub. Date: Nov. 22, 2012

(65) Prior Publication Data
US 2014/0193732 A1 Jul. 10, 2014

(30) Foreign Application Priority Data

May 19, 2011 (IT) .............................. VR2011A0109

(51) Int. Cl.
*H01M 8/04* (2016.01)
(52) U.S. Cl.
CPC ....... *H01M 8/04902* (2013.01); *H01M 8/0491* (2013.01); *H01M 8/04798* (2013.01); *H01M 8/04962* (2013.01); *H01M 8/04992* (2013.01); *Y02E 60/50* (2013.01)
(58) Field of Classification Search
CPC ................... H01M 8/04902; H01M 8/04798; H01M 8/0491; H01M 8/04992; H01M 8/04962
See application file for complete search history.

(56) References Cited

U.S. PATENT DOCUMENTS

| | | | |
|---|---|---|---|
| 7,569,293 | B1 | 8/2009 | Cross, III |
| 2004/0224193 | A1* | 11/2004 | Mitlitsky .......... H01M 8/04052 429/411 |
| 2006/0269825 | A1 | 11/2006 | Kim et al. ....................... 429/41 |
| 2013/0260269 | A1 | 10/2013 | Leah et al. ..................... 429/415 |

FOREIGN PATENT DOCUMENTS

| | | |
|---|---|---|
| CN | 1947297 | 4/2007 |
| CN | 101015083 | 8/2007 |
| EP | 1 798 796 | 6/2007 |
| JP | 2006-332062 | 12/2006 |

OTHER PUBLICATIONS

Schiavetti Pierluigi et al., "Efficiency measurement and uncertainty discussion of an electric engine powered by a self-breathing and a self-humidified proton exchange membrane fuel cell", *Review of Scientific Instruments*, AIP, Melville, NY, US, vol. 78, No. 8, Aug. 20, 2007, pp. 85107-85107.

* cited by examiner

Primary Examiner — Stewart Fraser
(74) Attorney, Agent, or Firm — Ostrolenk Faber LLP (57) ABSTRACT

According to a first aspect, the present invention relates to a method of controlling a fuel cell, comprising a step of controlling the fuel cell electric efficiency per unit of active surface area by checking and/or adjusting the current density produced in the fuel cell per unit of active surface area.

According to another aspect, the present invention concerns a fuel cell suitable for obtaining an electric power output, which comprises, among the other things, control means of the electric efficiency of the fuel cell including means suitable for checking and/or adjusting the current density produced in the fuel cell per unit of active surface area.

26 Claims, 5 Drawing Sheets

Fig. 1

Inlet Oxidant mixture prepared by using pure (99,995%) oxygen and pure nitrogen (99,98%) at a temperature of 20°C and a pressure of 1 atm.

METHOD OF CONTROLLING AND MAXIMIZING THE ELECTRIC EFFICIENCY AND THE POWER OUTPUT OF A FUEL CELL

FIELD OF THE INVENTION

The present invention relates to a novel method of controlling and maximizing the electric efficiency and the power output of a fuel cell.

BACKGROUND OF THE INVENTION

As it is known in the art, a fuel cell is an electrochemical device or apparatus suitable for producing an electromotive force by taking advantage of electron exchange occurring in Red-Ox reactions. The electric efficiency of an electrochemical device is measured by the ratio of chemical energy conversion, which is here defined as Gibbs free energy associated with an unitary molar amount of reagents involved in a Red-Ox reaction, which takes place in the electrochemical device in question, into electric power.

So far, it has been the general pursuit the reduction to a minimum of the production costs of a fuel cell, that are directly proportional to the active surface area of the involved electrodes, and such a need has directed the research efforts towards developing fuel cells with the highest possible ratio of electric power density supplied per unit of active surface area of the electrodes.

Moreover, the fuel cell development strategies of today, independently from the specific electrochemical processes taking place in the fuel cell, are based on the assumption that the internal dissipative resistances of an fuel cell are set by the technological characteristics of the apparatus itself, such as type of materials, catalysts, cell architecture, electrolytes and the thermodynamics of the reactions that take place in the apparatus. The same also applies to the electric efficiency. Furthermore, the provision of feeding flows of the reagents at almost constant pressure and concentration implies that the electric power density produced per unit of active surface area is also determined by the technological characteristics of the apparatus. This implies that, since the electric power density producible by a given piece of electrochemical technology is fixed, it is possible to determine the total electric power output simply by determining the total electrodes surface area involved in the reaction.

More particularly, independently of the used technology it is generally implicitly assumed that the relation between the current density produced per unit of active surface area (i.e. the electric power density produced per unit of electrodes active surface area) and the electrical efficiency of a fuel cell, is negligible or none. In other words, the established theory was that the fuel cell efficiency is independent from the electric current density obtained per unit of active surface area of the electrodes. This assumption together with the need of reducing the production costs of fuel cells has led to the pursuit of materials, catalysts, cell architectures, electrolytes and processes geared to obtaining the lowest possible internal resistance and the highest possible current density per unit of active surface area.

With reference to a fuel cell, "main Red-Ox reactions" are defined as the Red-Ox reactions involved in the production of an electric current flowing in an external circuit connected in parallel to the fuel cell. Any chemicals not involved in the main Red-Ox reactions are defined as "diluents", whereas any chemicals actually involved in the main Red-Ox reactions are defined as "reagents". Of course, diluents, here includes all the range of possible chemicals.

SUMMARY OF THE INVENTION

The main object of the present invention is to provide a method of controlling the electric efficiency of a fuel cell in an easy and rapid way.

Another object of the present invention is to provide a method of controlling the electric efficiency of a fuel cell before the operating of the fuel cell itself.

Another object of the present invention is to provide a method of controlling the electric power output of a fuel cell which is suitable for dynamically optimizing according to requirements the balance between output power and current efficiency, thereby increasing the energy conversion efficiency close to 100% with respect to the Gibbs free energy associated with the reactions taking place in the fuel cell.

Another object of the present invention is to provide a method of controlling the electric power output of a fuel cell independently from the technological characteristics of the fuel cell and the chemical-kinetic phenomena occurring in the fuel cell.

Another object of the present invention is to provide a method of controlling the electric power output of a fuel cell independently from the amount of the electrodes active surface area involved in the reactions.

Another object of the present invention is to provide a method of measuring the electric efficiency of a fuel cell.

Another object of the present invention is to provide a method of controlling and gauging the electric power output of a fuel cell suitable for controlling any type of fuel cell.

Another object of the present invention is to provide a method of controlling the ratio between thermal power and electric power produced by a fuel cell.

Another object of the present invention is to provide a fuel cell in which the electric efficiency can be rapidly controlled.

Another object of the present invention is to provide a fuel cell which is suitable for obtaining a high electric efficiency.

Another object of the present invention is to provide a fuel cell for maximizing the electric efficiency and the power output of a fuel cell.

According to a first aspect of the present invention a method of controlling a fuel cell is provided, which comprises a step of controlling the fuel cell electric efficiency per unit of active surface area by checking and/or adjusting the current density produced in the fuel cell per unit of active surface area.

Advantageously the method of controlling a fuel cell according to the present invention comprises the following steps:

determining, at a predetermined operation pressure, an electric efficiency curve per unit of active surface area as a function of the current density produced in the fuel cell per unit of active surface area;

establishing a desired electrical efficiency value, thereby determining a suitable current density in accordance to the electric efficiency curve; and producing in the fuel cell a current density value equal to, or lower than, said suitable current density.

More advantageously, the method comprises the following steps:

determining, at a predetermined operation pressure, an electric power output curve per unit of active surface area as a function of the current density produced in the fuel cell per unit of active surface area, determining the total amount of active surface;

establishing a desired electric power output value, thereby determining a electrical efficiency and a current density in accordance with the electric efficiency curve and to the electric power output curve.

Still more advantageously, the current density is established on the base of dilution value(s) of at least one reagent used to fuel the reaction occurring in the fuel cell.

Preferably, the current density is increased or decreased either by adding or subtracting reagents or diluents either already available in, or before or while being fed to, the cathodic and/or anodic area of said fuel cell, thereby decreasing or increasing the electric efficiency.

According to another aspect of the present invention, there is provided a method of evaluating the electric efficiency of a fuel cell comprising the following steps:
- arranging a circuit including a fuel cell and a resistor electrically connected with the fuel cell,
- supplying the circuit with reagents having known dilution;
- evaluating a reference electric efficiency for the fuel cell supplied with the reagents having known dilution;
- evaluating the reference voltage drop across the resistor;
- changing the dilution of at least one reagent;
- changing the resistance of the resistor until a voltage drop across the resistor equal to the reference voltage drop is obtained; and
- evaluating the electric efficiency of the fuel cell on the base of the reference electric efficiency of the fuel cell, of the dilution of the reagents to be fed to the fuel cell before and after changing the dilution of the at least one reagent, and on the base of the ratio of resistor resistances before and after changing the resistance of the resistor.

According to further aspect of the present invention, there is provided a method of evaluating the electric efficiency of a fuel cell comprising the following steps:
- arranging a first fuel cell, whose electric efficiency is to be determined, in electrical connection with a first resistor of known resistance value, thereby obtaining a first circuit;
- arranging a second circuit including a second fuel cell identical to the first fuel cell, and a second resistor electrically connected with the second fuel cell,
- supplying the first and the second circuit with reagents having a known dilution(s);
- evaluating the electric efficiency of the second fuel cell on the base of its respective reagent dilution(s);
- evaluating the voltage drop across the resistor of the first and of the second circuit;
- keeping the second resistor at a predetermined value and varying the first resistor until the same voltage drop across the resistor of the first and the second circuit is obtained, thereby determining a first resistor value; and
- evaluating the electric efficiency of the first fuel cell on the base of the electric efficiency of the second fuel cell, of the reagent dilution(s) to be fed to the fuel cell, and on the base of the ratio of first resistor value to second predetermined resistor value.

According to a further aspect of the present invention a fuel cell is provided, which is suitable for obtaining an electric power output comprising:
- a casing in which an intermediate space is delimited between a cathodic space and an anodic space;
- at least one electrolytic material located in the intermediate space;
- a positive electrode electrically connected to the end of said electrolytic material at the cathodic space;
- a negative electrode electrically connected to the end of the electrolytic material at the anodic space;
- an oxidant inlet mixture in fluid communication with the cathodic space; and
- a reducing inlet mixture in fluid communication with the anodic space, the fuel cell comprising control means of the electric efficiency of the fuel cell including means suitable for checking and/or adjusting the current density produced in the fuel cell per unit of active surface area.

Advantageously, said means suitable for checking the current density comprises means suitable for checking the dilution value of the reagents of the fuel cell.

BRIEF DESCRIPTION OF THE DRAWINGS

Further aspects and advantages of the present invention are detailed by the following description of specific embodiments of the present invention, referring to the accompanying drawings, in which.

In the drawings, equivalent or similar parts or components were marked with the same reference numerals.

DETAILED DESCRIPTION OF THE PREFERRED EMBODIMENTS

A method in accordance with present invention is based on the finding that a strict correlation exists between the efficiency of a fuel cell and the electric current produced per unit of active surface of the fuel cell, and, in turn, the current density produced per unit of active surface area (i.e. the electric power density produced per unit of active surface area). Such a correlation is prompted by the intrinsic characteristics of the fuel cell, such as fuel cell architecture, electrolyte(s), catalyst(s) and the thermodynamics of the reaction taking place in the fuel cell, i.e. independently of the used technology. More particularly, the same correlation is apparently due to an interaction between the intrinsic electronic feature of a fuel cell and an intrinsic characteristic of the reaction occurring in it.

The applicant's research results have shown that it is possible to dynamically control the surface density of the current generated by a fuel cell by acting upon parameters totally independent by the fuel cell technology adopted, such parameters typically including pressure and dilution of the oxidizing and/or reducing agents used to feed the reaction.

From an electronic point of view, a fuel cell can be regarded as a source of current with a capacitor in parallel whose capacitance is determined by the technological characteristics of the specific fuel cell involved. Owing to the kinetics of the electrochemical reactions involved, an electrochemical noise is generated which is proportional to the rate of electrochemical reactions, this resulting in an electrical noise being obtained at the plates of the capacitor that has a frequency and an amplitude proportional to the density of the current produced per active surface unit. The higher the current density produced the higher the cathode overvoltage and the electrical power dissipated by Joule effect on the capacitor, which causes a temperature increase in the fuel cell and thus a reduction in the electricity efficiency.

To this regards, the applicant of the present invention has discovered that each fuel cell may be properly described by two characteristic curves or diagrams, i.e. the electric power output curve (hereinafter $EPC(P_{OX};P_{RED})$) and the electric efficiency curve (hereinafter $EEC(P_{OX};P_{RED})$) both defined per unit of active surface area, and describing respectively the variation of electric power output and cell electric efficiency as a function of the current density of the fuel cell, i.e. as a function of reagents pressure, dilution or concentration of a tested fuel cell controlled by the method according to the invention. Such curves are shown in the diagram of FIG. 1, and generally depend upon the pressure of reagents in the feeding chamber and upon the technological characteristics of the fuel cell as both depend upon the value of the capacitance of the capacitor referred to above.

Figure 1:
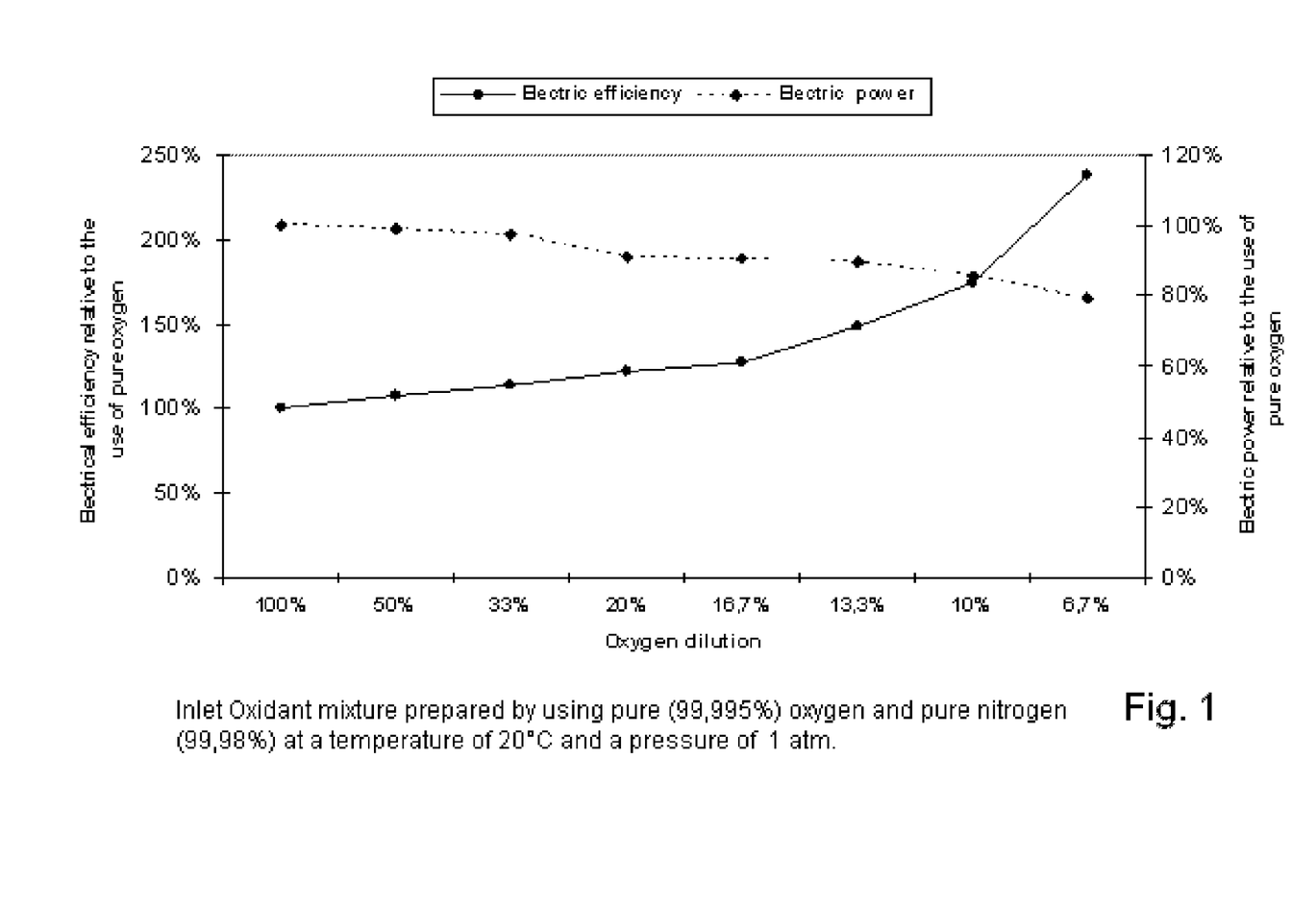
FIG. 1 shows a diagram relating to an electric power output curve and an electric efficiency curve of a fuel cell as a function of the dilution parameter A of the inlet oxidant mixture (ratio between the volume of pure oxygen and pure nitrogen used as diluent, at a temperature of 20° C. and a pressure of 1 atm)

The diagram of FIG. 1 shows that in the tested fuel cell a considerably higher increase in electrical efficiency was obtained for oxygen dilutions (mean dilution of oxygen in air nitrogen) higher than a specific threshold value, i.e. 21%. It should be noted that according to the present invention, electrical efficiency is increased if the oxygen concentrations in the oxidant inlet mixtures are reduced, but a remarkable increase of the electrical efficiency is obtainable for a concentration of oxygen lower in the oxidant inlet mixture than 21%.

These experimental results are of substantial interest in that they open up new opportunities for developing novel energy conversion systems, both primary, e.g. thermal power plants based on combustion of fossil fuels, and secondary ones, e.g. motors, energy storage systems, auxiliary equipment, and the like, and thus, no longer based on thermo-kinetic technologies that are quite limited in efficiency but rather on high-efficiency electro-chemical technologies. Thus, owing to the present invention both efficiency and costs can be improved.

More particularly, primary conversion systems can include, for example fuel cells supplied by methane, ethane, propane, gasified coal, any reformed hydrocarbon, whereas second conversion systems can include, for example fuel cells supplied by any reformed hydrocarbon or reforming-derived hydrogen. Referring to fuel cells supplied by reforming-derived hydrogen or gasified coal the supplied reducing mixture can include CO and $CO_2$, which act as performing diluents of the reducing reagent, e.g. hydrogen.

The same results also show that it is possible to design electric power control systems, even integrated in the fuel cell, suitable for dynamically optimizing, according to requirements, the balance between output power and efficiency, and to increase the efficiency of energy conversion of the fuel cell to values very close to 100% with respect to the Gibbs free energy associated to the amount of moles of reagents involved in the reaction occurring in the apparatus.

Such an increase in performance of a fuel cell is obtained by modifying the electric current density produced on the electrode active surfaces by acting on an external parameter such as the dilution of the oxidant and/or the reducing agent(s) used to fuel the reaction occurring in the apparatus.

Other methods may be used for setting the current density produced on the electrode active surface, e.g. by changing the permeability of the gas diffusion layers, the conductivity of the electrodes or the electrolyte concentration. These techniques involve direct manipulation of the used fuel cell and do not allow a dynamic control of the obtained current density as it is obtainable by acting on the diluting of the oxidant and/or the reducing agent/s.

Moreover, the current density can be controlled or adjusted owing to the combination of the above-mentioned techniques.

Thus, the control method according to the present invention is applicable independently from the technology of the adopted fuel cell. Moreover, the intrinsic chemical-kinetic phenomenon on which it is based makes it possible to apply the control method according to the invention to fuel cells of any type regardless of the geometry of the cell, the electrochemical process involved, or the type of fuel being used.

Once the characteristic curves $EPC(P_{OX};P_{RED})$ and $EEC(P_{OX};P_{RED})$ of an fuel cell are experimentally determined, one can increase (up to a maximum concentration value set by the reagent supply source), or decrease (with no limitation) the dilution or concentration of the reagent(s) taking part in the reactions occurring in the fuel cell.

An increase or decrease in reagent(s) concentration can be caused either by adding or subtracting reagent(s) or diluent(s) either already available in, or before or while being fed to the cathodic and/or anodic area of the fuel cell. The reagent(s) or diluent(s) can be added or subtracted either in a chemical or in a physical way.

Example

Application of the Electric Efficiency and Power Output Control Method to a PEM Fuel Cell A polymeric electrolyte fuel cell (PEM) was used to produce an electromotive force exploiting the following Red-Ox reaction between oxygen and hydrogen:

$$H_2 \rightarrow 2\,H^+ + 2e^-$$

$$\underline{1/2\,O_2 + 2\,H^+ + 2e^- \rightarrow H_2O}$$

$$H_2 + 1/2\,O_2 \rightarrow H_2O$$

Main Red- *Ox* reaction

The fuel cell was fed with hydrogen obtained by electrolysis and with variable stoichiometric mixtures of oxygen-nitrogen (having a different value of the mean stoichiometric ratio $\lambda$).

Function $\lambda$, when parameterized in one dimension on the z coordinate axis along the channel or chamber of the cathodic space, is generally defined as:

$$\lambda := \frac{V_{o_2}[l]}{V_{mix}[l]} = \lambda(z, t) \rightarrow (0, 1] \quad (1)$$

where $V_{o_2}$ is the volume of pure oxygen at ambient pressure and at a temperature of 4° C., $V_{mix}$ is the volume of oxidant inlet mixture (in the same standard conditions), and $t$ is the time. In the case of an ideal transport of oxygen through the porous layers (which are usually located on the cathodic electrode and are arranged to increase the oxygen distribution thereon), and assuming the condition of minimum feeding flux of oxidant mixture:

$$\phi_{feed}^{O_2} \approx \phi_{consumption}^{O_2} \quad (2)$$

where $\phi_{feed}^{O_2}$ is the inlet flux and $\phi_{consumption}^{O_2}$ is the consumption flux,
the local oxygen concentration decreases exponentially with z according to the following algorithm:

$$\lambda(z) = \lambda_{bulk} e^{\frac{-z}{\alpha}} \quad (3)$$

where $\lambda_{bulk}$ is the stoichiometric ratio between oxygen and oxidant mixture (i.e. oxygen plus diluent) in the oxidant inlet mixture (see below).

In order to reduce the effect of (3), while maintaining the oxygen concentration almost uniformly distributed along the channel or chamber of the cathodic space, it was chosen to work with a cell having a square active surface (2 cm side) with a central opening through which oxygen was supplied into the cathodic channel or chamber, and set the feeding flow 75 times greater than the consumption flow, in order to satisfy the condition $$\phi_{feed}^{O_2} \gg \phi_{consumption}^{O_2} \quad (4)$$

In order to satisfy the time invariance condition $$\frac{\partial \lambda}{\partial t} = 0 \quad (5)$$

the cell was fed at constant pressure (a slight atmospheric overpressure) and constant stoichiometric gas ratio $\lambda_{bulk}$.

Measures of the open circuit cell potential and the current flowing in the circuit were made by measuring the voltage drop across a known resistance electrically connected to the cell, in parallel therewith. The measures performed made it also possible to determine the cathode overvoltage as a function of current density ($\eta = E - E_{eq}$).

TABLE 1

| % $O_2$ $\lambda$ | (mA) | H (1Ω) (mV) |
|---|---|---|
| 100.0% | 400 | −634 |
| 50.0% | 396 | −638 |
| 33.3% | 392 | −642 |
| 20.0% | 381 | −653 |
| 16.7% | 372 | −669 |
| 13.3% | 330 | −704 |
| 10.0% | 351 | −683 |
| 6.7% | 328 | −706 |
| 5.0% | 265 | −769 |

The current measurements show, at constant cathode active surface area $\theta^c$, a decrease in the mean surface current density, while $\lambda$ lowers towards 0.

The electrical efficiency $\mu^e$ of the cell can be defined as:

$$\mu^e = \frac{W^e}{K_{O_2} V^c} \in [0, 1] \quad (6)$$

$$K_{O_2} \, 285.83 \left[\frac{KJ}{mol}\right]$$

where is the molar density of the free Gibbs energy associated with the oxygen with respect to the reaction:

$$\frac{1}{2} O_2 + H_2 \to H_2O \quad (7)$$

$$V^c \left[\frac{mol}{s}\right]$$

is the oxygen consumption in the unity of time t and $$W^e \left[\frac{KJ}{s}\right]$$

is the electric power generated by the fuel cell. More particularly, one can observe that with $\mu^e = 1$, all free Gibbs energy in the reaction (6) is transformed into electric energy.

Now one can observe that:

$$V^c = \frac{\lambda \phi}{\Theta^c} \quad (8)$$

where $\Theta^c$ is the cathode active surface area and $\phi$ the flux of the inlet oxidant or oxidizing mixture:

$$\mu^e = \frac{W^e}{K_{O_2}} \frac{\Theta^c}{\lambda \phi} \quad (9)$$

We observe first that in general it is quite reasonable to suppose, as long as it can be considered negligible edge effects, the following condition of invariance.

$$\frac{\partial \mu^e}{\partial \Theta^c} = 0 \quad (10)$$

Suppose now to consider also a condition of invariance of the electric efficiency from the dilution parameter:

$$\frac{\partial \mu^e}{\partial \lambda} = 0 \quad (11)$$

By definition it is known that:

$$\mu^e = \frac{W^e}{K_{O_2}} \frac{\Theta^c}{\lambda \phi} \quad (12)$$

Now if the conditions (10) and (11) must be respected, the quantity $W^e$ should be given by the following formula:

$$W^e = A \cdot \frac{\lambda}{\Theta^c} \quad (13)$$

where A is a suitable constant of proportionality.

Thus, if the assumption (11) is correct, a linear dependence between the cell electric power output and the dilution parameter λ should occur.

Figure 2:
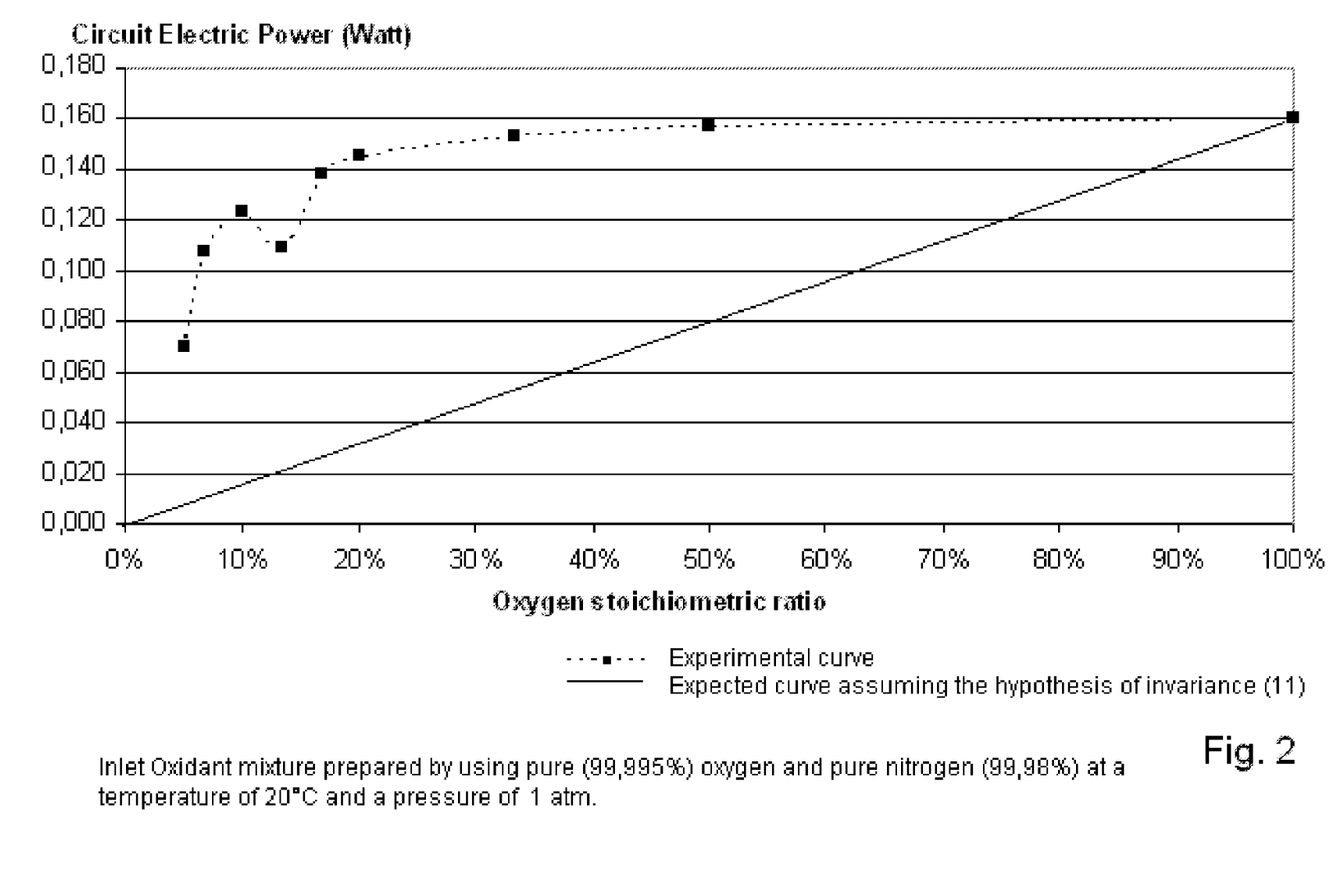
FIG. 2 shows a diagram relating to a polymer electrolyte fuel cell electric power output curve as a function of the dilution parameter A of the inlet oxidant mixture (ratio between the volume of pure oxygen and pure nitrogen used as diluent, at a temperature of 20° C. and a pressure of 1 atm)

However, we carried out a number of tests, the results thereof are shown in the Graph of FIG. 2, which clearly demonstrated that such a linear dependence is not obtained, thereby demonstrating false the hypothesis (11).

Such observations and tests make it possible to deduce the existence of a non-trivial functional relationship linking those quantities, and in particular allow observing a noticeable improvement in power efficiency by reducing the surface density of the current, which means in particular that in the range of measures considered in place of the report condition (11) is instead the condition:

$$\frac{\partial \mu^e}{\partial \lambda} \leq 0 \quad (14)$$

As it will be understood, from the formula (12) both an explicit relation between the electric efficiency and the dilution parameter and an implicit relation can be evaluated, the implicit relation occurring since, as a matter of fact, $W^e$ must depend upon the dilution parameter. Moreover, tests carried out by the applicant of the present application have shown that $W^e$ must depend upon the dilution parameter in a non-linear way, and thus such tests have confirmed that the electric efficiency $\mu^e$ depends upon the dilution parameter, and, in turn, upon the current density.

More particularly, it is of interest to note that the electrical efficiency of the fuel cells depends substantially on external factors such as the dilution parameters λ, i.e. intrinsic parameters to the red-ox process rather than structural parameters or parameters concerning the geometry of the cell.

In view of the relation (9), the above described protocol makes it possible also to determine the relative electric efficiency $\mu^e(\lambda)/\mu^e(\lambda^*)$, that represents the gain on a known value of the electrical efficiency $\mu^e(\lambda^*)$.

Suppose to compare two circuits each comprising a fuel cell, and a resistance $R^\lambda$ (the resistor of the first fuel cell) and $R^1$ (the resistor of the second fuel cell) electrically connected, connected in parallel with the fuel cell, the first cell being fed with an oxidant mixture with 0<λ<1, and the second cell with an oxidant mixture having λ=1.

The fuel cell of one circuit is identical to the fuel cell of the other circuit, i.e. the fuel cells have the same technology and the same amount of electrodes active surface area involved in the reactions.

The oxygen consumption occurs according to the relation $$V^c = \frac{\lambda \phi}{\Theta^c}$$

and linearly depends upon λ. The oxygen consumption of the two respective circuits will occur according to the following relation:

$$V^c_\lambda = \lambda V^c_1 \quad (15)$$

If one compares the electric power output dissipated by the two circuits with the same consumption, one has to consider λ circuits with FC(0<λ<1) and 1 with FC(λ=1).

The only one equation describing the electrical behavior of the circuit is that concerning the mean surface current density:

$$I = \bar{J}\Theta^c = k^* F V^c \Theta^c \quad (16)$$

The variable to be set is the resistance $R^\lambda$ and/or $R^1$.

A choice would be to select $R^\lambda$ and $R^1$ so that in both circuits the voltage drop across the resistor is the same.

The current density is proportional to the dilution parameter, so that through the circuit fed with diluted oxygen a lower current with respect to the circuit fed with pure oxygen will flow. In order to obtain the same ΔV, the resistors in the two circuits must satisfy the condition $R^\lambda > R^1$.

It is possible to proceed by keeping $R^1$ at a fixed value and varying the resistor $R^\lambda$ in order to determine x (see following formula (18)) in such a way that:

$$\frac{\Delta V^\lambda}{R^\lambda} = I^\lambda \quad (17)$$

$$= k^* F \frac{\lambda \phi}{\Theta^c}$$

$$= k^* F \lambda \phi$$

$$= \lambda I^1$$

$$= \lambda \frac{\Delta V^1}{R^1}$$

or in such a way as both the following conditions are satisfied:

$$\begin{cases} I^\lambda = \lambda I^1 \\ R^\lambda = x R^1 \end{cases} \quad (18)$$

Bearing in mind that by definition $$\mu^e(\lambda)/\mu^e(1) = \frac{V^c(1)}{V^c(1)} \frac{W^e(1)}{W^e(\lambda)} \quad (19)$$

it is possible to obtain $$\mu^e(\lambda)/\mu^e(1) = \frac{I(1)}{I(\lambda)} \frac{W^e(\lambda)}{W^e(1)} \quad (20)$$

$$= \frac{I(1)}{\lambda I(1)} \frac{\lambda^2 I^2(1) x R^1}{I^2(1) R^1}$$

$$= \lambda x$$

that is $$\mu^e(\lambda)/\mu^e(1) = \lambda x \quad (21)$$

Accordingly, the applicant of the present invention, on the base of his findings that the electric efficiency of a fuel cell depends upon the current density produced on the electrode active surface area, and so can be controlled setting the dilution of the reagents to be fed to the fuel cell, has also developed a method of evaluating and controlling the electric efficiency of the fuel cell on the base of the electric efficiency of a reference fuel cell having a known electric efficiency.

Clearly, a method of evaluating and controlling the electric efficiency of a fuel cell can also be obtained by fixing the dilution parameter of the fuel cell, and by evaluating the electric efficiency thereof, thereby obtaining a reference electric efficiency.

After that, the electric efficiency during the operation of the same fuel cell can be evaluated at any time on the base of the above-mentioned formula (21).

Thus, owing to a method according to the present invention it is possible to evaluate an electric efficiency without using sensors or similar components, but referring to a reference electric efficiency of the same fuel cell or of a reference fuel cell.

TABLE 2

| % $O_2$ λ | x | x λ |
|---|---|---|
| 100.0% | 1 | 1.00 |
| 50.0% | 2.828 | 1.41 |
| 33.3% | 4.85 | 1.62 |
| 20.0% | | |
| 16.7% | 11.16 | 1.86 |
| 13.3% | 15.1 | 2.01 |
| 10.0% | 22.9 | 2.29 |
| 6.7% | 35.1 | 2.35 |
| 5.0% | 48.2 | 2.41 |

Figure 3:
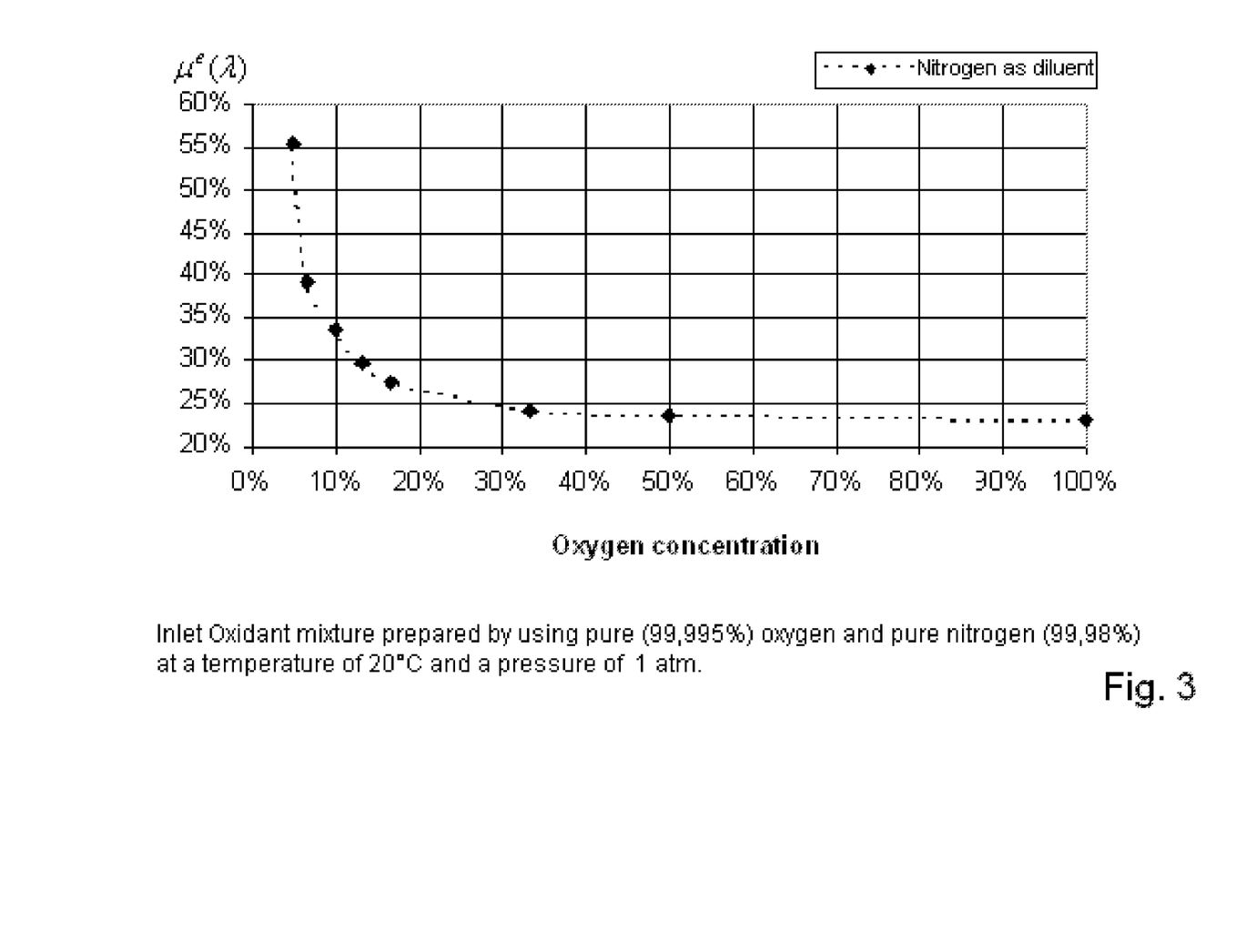
FIG. 3 shows a diagram relating to an electric efficiency curve of a polymer electrolyte fuel cell as a function of the oxygen concentration in an inlet oxidant mixture with pure nitrogen at a temperature of 20° C. and a pressure of 1 atm.

The diagram of FIG. 3 shows that in the tested fuel cell a considerably higher increase in electrical efficiency was obtained for oxygen concentrations (mean concentration of oxygen in nitrogen) lower than a specific threshold value, i.e. 16%.

Thus, the present invention relates to a method of controlling a fuel cell, which comprises a step of controlling the fuel cell electric efficiency per unit of active surface area by checking and/or adjusting the current density produced in the fuel cell per unit of active surface area.

As it will be understood, owing to the present invention, it is possible also to maximize the electric efficiency and the power output of a fuel cell.

According to the present invention, there are two main patterns of operation of a fuel cell depending on whether the cathodic and/or anodic active surface area involved in the reactions is constant or variable.

In the case of a fuel cell having cathodic and anodic active surface area involved in the reaction constant over time, the whole output power is predetermined by the total amount of active surface area according to the $EPC(P_{OX};P_{RED})$ curve. Accordingly, once the characteristic curves are known, and, preferably, once the forecasted plan of the load curve, i.e. the curve describing the time-varying power supply required to the fuel cell throughout the operative life thereof (hereinafter LC), is also known, one can determine the total amount of active surface area that has to be involved in the reaction and the optimal dilution of the reagent(s) in order to maximize the average electric efficiency provided by the fuel cell over time.

The fuel cell can be so designed as to operate with a reagent dilution(s) constant or variable over time by equipping the apparatus with an (integrated) control system arranged to control the dilution of the used oxidants and/or reducing agents.

The expression "raw mixtures" in the present invention is designed to indicate any mixture of reagents and diluents having an arbitrary (not controlled) stoichiometric ratio between the chemicals, i.e. between reagents and diluents. Such raw mixtures can be supplied by the atmosphere (air used as oxidant mixture) or from a storage.

The expression "inlet mixtures", instead, indicates all the mixtures of reagents and diluents that are used to feed the electro chemicals reactions in a fuel cell without undergoing any treatment process to modify the stoichiometric ratio of the chemicals composed. To obtain inlet mixtures, in general, it is possible to mix together an arbitrary number of raw mixtures containing reagents and diluents in different proportions. It should be understood, that when the raw mixtures have a correct (i.e. suitable for being used in the fuel cell) stoichiometric ratio, the inlet mixtures correspond to the raw mixtures.

When operating in a constant reagents dilution configuration, where the required inlet reagents concentrations are, respectively, $C_0^{(ox)}$ for the oxidizing mixture and $C_0^{(red)}$ for the reducing mixture, the concentration $C_0^{(ox)}$ and $C_0^{(red)}$ is obtained by addition to, or subtraction from, diluent or reagent substances, depending upon whether the raw mixtures are more diluted or less diluted than the inlet reagents mixture concentrations $C_0^{(ox)}$ and $C_0^{(red)}$.

Either an external addition or subtraction can be carried out.

Figure 4:
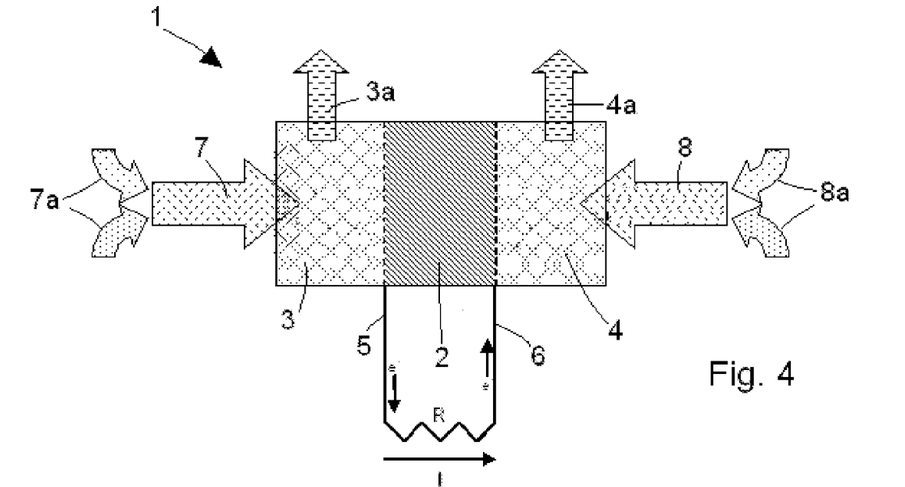
FIGS. 4 to 7 show schematically a method and a respective fuel cell according to the present invention.

A scheme of external addition or adjunction is shown in FIG. 4, where the concentrations of reagents and diluents in the raw mixtures are deemed to be known, whereas the inlet mixtures are prepared by mixing available raw mixtures in proportions suitable for feeding inlet mixtures in which the reagents and the diluents are in a desired stoichiometric ratio.

The inlet mixtures can be obtained directly by mixing the feeding raw mixtures immediately upstream of the fuel cell or by pre-mixing the raw mixtures in storage devices, from which the inlet mixtures are obtainable. The inlet mixtures thus obtained are then caused to flow on the active surfaces of the fuel cell and discharged when the concentration of the reagents is lower than a predetermined limit value. In this case, it is possible to obtain changes over the time dilution of the reagents intervening directly in the pre-mixing phase by varying (increasing or decreasing) the flow rate of the raw mixtures or by changing the concentration of any species (i.e. reagents and diluents) in each raw reagent mixture.

More particularly, in FIG. 4 a fuel cell 1 is shown, which is suitable for obtaining an electric power output, and comprises a casing (not shown) in which an intermediate space 2 is delimited between a cathodic space 3, and an anodic space 4, at least one electrolytic material being located in the intermediate space 4, whereas a positive electrode 5 is electrically connected to the end of said electrolytic material at the cathodic space 3, and a negative electrode 6 is electrically connected to the end of the electrolytic material at the anodic space 4.

According to the present invention, the electrolytic material can be, for example, selected from the group including salt water, aqueous alkaline (KOH) solution, polymer membrane, molten phosphoric acid ($H_3PO_4$), molten carbonate, solid oxide, such as $O^{2-}$-conducting ceramic oxide or $H^+$-conducting ceramic oxide.

Furthermore, the fuel cell includes control means of the electric efficiency of said fuel cell comprising suitable means suitable for checking and/or adjusting the current density produced in the fuel cell per unit of active surface area.

Moreover, the fuel cell includes an oxidant inlet mixture 7 in fluid communication with the cathodic space 3, and a reducing inlet mixture 8 in fluid communication with the anodic space 4.

Particularly referring to the fuel cell shown on FIG. 4, oxidant inlet mixture is obtained by mixing a number (two shown on Figure) of raw mixtures 7a, whereas reducing inlet mixture 8 is obtained by mixing a number (two shown on Figure) of raw mixtures 8a.

Discharge mixtures 3a and 4a from the cathodic space 3, and anodic space 4, respectively, are also shown.

Optionally, the fuel cell can include control means of the electric efficiency including means suitable for checking the dilution value of the reagents of the fuel cell.

Preferably, the fuel cell comprises:
  means for checking the dilution of the oxidant and/or reducing agent(s) used to fuel the reaction that will occur out in the fuel cell;
  means for comparing the checked dilution(s) with desired maximum dilution value(s); and
  means for controllably increasing or decreasing the dilution of said reagents, thereby decreasing or increasing the electric efficiency of said fuel cell, such means for controllably increasing or decreasing can include a source of diluent(s) in fluid communication with the cathodic space, the anodic space, the oxidant inlet mixture and/or the reducing inlet mixture.

Advantageously, the fuel cell can comprise means for varying the electric efficiency including means for increasing or decreasing the current density, which can include means for adding or subtracting reagents or diluents either already available in, or before or while being fed to, the cathodic and/or anodic area of said fuel cell.

Figure 5:
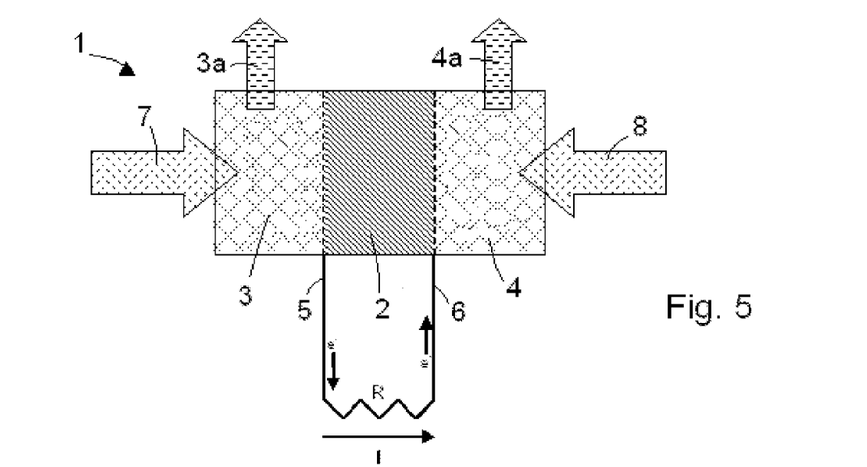

A scheme of internal adjunction is shown in FIG. 5, where the concentration of available raw mixtures is known, and it is possible to provide a diluent ambient directly in the reaction chamber, i.e. the cathodic and anodic spaces of the fuel cell. Then a previously known volume of diluents mixture is injected under pressure into the electrochemical reaction chamber. The fuel cell is fed with the mixture containing the reagent with a feed flow adjusted with respect to the reagents consumption rate in order to maintain a constant dilution of the reagents in the reaction chambers or channels of the fuel cell. The exhaust flows in this case are proportional to the portion of diluents contained in the feeding mixtures. Thus, it is possible to make changes in the time dilution of the reagents by varying the pressure of the diluent mixtures in the reaction chamber.

Figure 6:
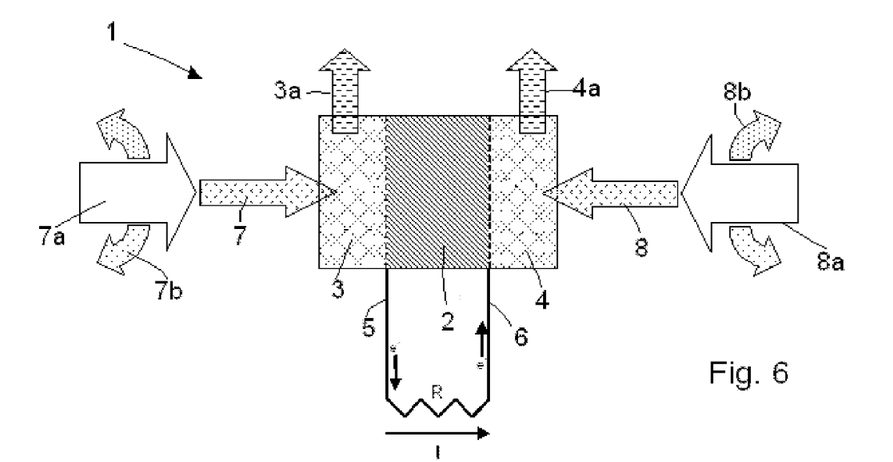

A scheme of external subtraction is instead shown in FIG. 6, where the concentration of available raw mixtures is known, and the inlet mixtures are prepared by removing reagents and/or diluents from the raw mixtures. Subtraction of one of the two species, or both, is carried out externally or outside the reaction chamber and can be obtained by applying any suitable physical or chemical method (e.g. adsorption membrane (PSA), fractional distillation or freezing, selective absorption membrane, and the like). To this end, subtraction streams 7b and 8b are shown.

The inlet mixtures thus obtained are then caused to flow on the active surfaces of the fuel cell and discharged when the concentrations of the reagents are lower than a predetermined limit value. In this case, the possibility of changing the dilution over time of reagents in the inlet mixture depends upon the adopted physical or chemical subtraction method.

Figure 7:
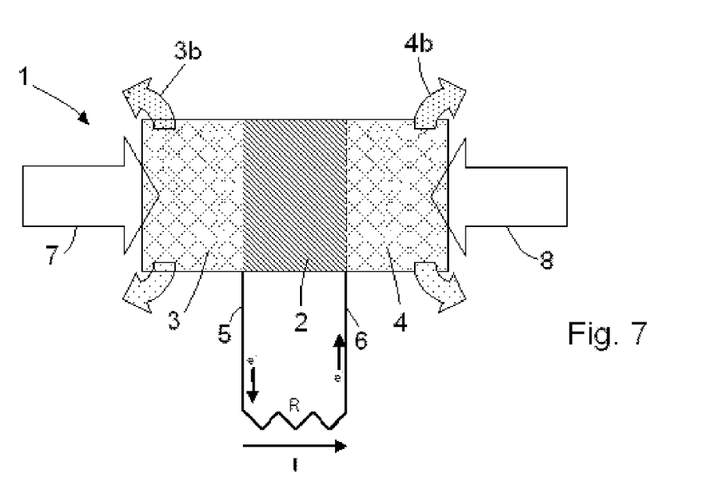

In FIG. 7 a scheme of internal subtraction is shown, where the concentrations of available raw mixtures are known, and the inlet mixtures are prepared by removing reagents and/or diluents from the raw mixtures. The subtraction of one of the two species, or both, is carried out inside the reaction chamber, i.e. the cathodic 3 and anodic 4 spaces, see subtraction streams 3b and 4b, and can be obtained by applying any suitable physical or chemical method (see also below). The exhaust flows, generally consisting of mixtures containing reagents and/or diluents species and/or other chemicals, are then discharged from the reaction chamber. In this case, the possibility to change dilution over time of reagents in the inlet mixture depends upon the adopted physical or chemical subtraction method.

Working in reagents dilution configuration variable over time, the concentrations $C^{ox}_{(t)}$ and $C^{red}_{(t)}$ of, respectively, the oxidizers and reducing agents in the inlet mixture at time t, can be obtained by applying one of the above described adjunction or subtraction schemes or methods, or a combination thereof, depending whether, at time t, the reagent raw mixtures are over- or under diluted with respect to the concentrations $C^{ox}_{(t)}$ and $C^{red}_{(t)}$.

According to a variant, the amount of cathodic and/or anodic active surface area involved in the reactions changes, i.e. it/they is/are time depending, and in such case the fuel cell is equipped with a gauge system that makes it possible to actively control the size of active surface (or electrodes) involved in the reaction from time to time.

In this case the obtainable power output of the cell depend upon the total amount of active surface areas involved in the reaction at time t.

A fuel cell generally consists of a number of unitary fuel cells (the unit being arbitrary) combined with one another and connected to each other in series and/or in parallel, thereby forming a so-called fuel cell stack.

Generally, whatever is the specific gauging system used to vary over time the amount of active surface areas involved in the reaction, it is possible to schematically represent such system as a system that increases or decreases the number of working (fed with fuel) unitary fuel cells electrically connected in parallel and/or in series in a stack.

Also in this case the apparatus can be designed so as to work with reagent dilution(s) constant or variable over time.

The methods that can be applied to control the concentrations of reagents and diluents in the inlet mixtures, in both configurations with time constant or variable concentrations are those described above either taken alone or in combination with one another.

In contrast to the configuration described above in which the size of cathodic and/or anodic active surfaces is set and kept constant in time, in this configuration it is possible to change from time to time the electric power output of the cell without changing the chosen electric efficiency of the fuel cell, achieved by setting the concentration of reagents in the inlet mixture, in line with the respective characteristic curve $EEC(P_{OX};P_{RED})$ of the fuel cell in question.

According to the state of the art, it is possible to increase or decrease the electric power output of a fuel cell system only by acting on the total amount of active surface area involved in the reactions, whereas the electric efficiency of the fuel cell is set by the technological characteristics of the cell itself.

On the contrary, according to the present invention, owing to the exploitation of the characteristic curves of electrochemical devices it is possible to obtain the following:
  by working with an active surface area and a reagents dilution configuration constant over time, it is possible to determine the total amount of active surface area that have to be involved in the reaction and the optimal dilution of the reagents in order to obtain the desired electric power output, and, differently from the state of the art, it is also possible, in accordance with the characteristic curves of the fuel cell and to the forecast plan of the load curve, to obtain an average electric efficiency higher than 90%;

by working in an active surface area and a variable reagents dilution configuration constant over time, in accordance with the characteristic curves of the cell, EPC($P_{OX}$;$P_{RED}$) and EEC($P_{OX}$;$P_{RED}$), it is possible to increase or decrease from time to time the electric power output and the electric efficiency, i.e. to increase or decrease the consumption of reagents per unit of watt hour produced;

by working in variable active surface area and reagents dilution configuration constant over time, it is possible to determine, in accordance with the EEC($P_{OX}$;$P_{RED}$) characteristic curve of the fuel cell being used, the optimal reagent dilution and the total amount of active surface area to be involved in order to obtain both maximum electric power output and the desired cell efficiency; a fuel cell according to the present invention in this case is suitable for producing a variable electric power output at constant electric efficiency; and by working in active surface area and reagents dilution configuration variable over time, it is possible to control the electric power output by acting on the total amount of active surface area involved in the reaction and/or by acting on the EPC(POX;PRED) characteristic curve of the apparatus to vary the concentration of reagents in the inlet reagent mixture; in this second case, depending upon the EEC(POX;PRED) characteristic curve of the cell, it is also possible to control the electric efficiency of the fuel cell.

The invention claimed is:

1. A method of controlling a fuel cell, comprising: controlling fuel cell electric efficiency by checking and adjusting a dilution gradient of reagents to vary reagent dilutions among different parts of active surfaces of electrodes of the fuel cell, and by checking and/or adjusting local current density produced in the fuel cell per unit of active surface area of the active surfaces.

2. A method of controlling a fuel cell as claimed in claim 1, further comprising,
determining, at a predetermined operation pressure, an electric efficiency curve (EEC($P_{OX}$;$P_{RED}$)) per unit of active surface area as a function of the current density produced in the fuel cell per unit of active surface area;
establishing a desired electrical efficiency value, thereby determining a suitable current density in accordance to the electric efficiency curve; and
producing in the fuel cell a current density value equal to, or lower than, said suitable current density.

3. A method as claimed in claim 1, further comprising,
determining, at a predetermined operation pressure, an electric power output curve (EPC($P_{OX}$;$P_{RED}$)) per unit of active surface area as a function of the current density produced in the fuel cell per unit of active surface area,
determining a total amount of active surface;
establishing a desired electric power output value, thereby determining a electrical efficiency and a current density in accordance with an electric efficiency curve (EEC($P_{OX}$;$P_{RED}$)) and to the electric power output curve (EPC($P_{OX}$;$P_{RED}$)).

4. A method as claimed in claim 1, wherein said current density is established based on one dilution value, or a plurality of dilution values, of at least one reagent used to fuel the reaction occurring in the fuel cell.

5. A method as claimed in claim 4, further comprising, checking a dilution of oxidant and/or reducing agent/s used to fuel a reaction that will occur in said fuel cell; comparing the checked dilution with a desired dilution value; and
if the checked dilution/s is/are higher or lower than the desired maximum dilution value/s, controllably increasing or decreasing the dilution of the oxidant and/or reducing agent/s.

6. A method as claimed in claim 1, wherein said current density is increased or decreased by adding or subtracting reagents or diluents already available in a cathodic and/or anodic area or by adding or subtracting reagents or diluents before being fed to the cathodic and/or anodic area or by adding or subtracting reagents or diluents while being fed to the cathodic and/or anodic area.

7. A method as claimed in claim 1, further comprising evaluating a load curve (LC) describing the time-varying power supply required by the fuel cell throughout the operation life thereof.

8. A method as claimed in claim 1, further comprising varying the total amount of active surface area involved in the reaction of the fuel cell, whereby ensuring the required power supply for the fuel cell.

9. A method as claimed in claim 1, further comprising, feeding inlet mixtures, including reagents and diluents, onto active surfaces of the fuel cell, and discharging them when the concentrations of the reagents are lower than predetermined limit values, said diluents being chemicals taking no part in the main Red-Ox reactions occurring in said fuel cell, whereas the reagents are involved in the main Red-Ox reactions occurring in said fuel cell, and the fuel cell includes at least one reaction chamber in which the main Red-Ox reactions occur.

10. A method as claimed in claim 9, further comprising prearranging and mixing a plurality of raw mixtures, thereby obtaining said inlet mixtures.

11. A method as claimed in claim 10, wherein the concentration of reagents and diluents of said raw mixtures is known, whereas the inlet mixtures are prepared by mixing available raw mixtures such that the reagents and the diluents are in a desired stoichiometric ratio in the resulting feeding inlet mixtures.

12. A method as claimed in claim 10, wherein the concentration of raw mixtures is known, and a dilution step is carried out directly in the reaction chamber of the fuel cell.

13. A method as claimed in claim 10, wherein a diluent mixture is injected under pressure into the reaction chamber of the fuel cell, and the fuel cell is fed with a mixture containing a reagent at a feed flow rate adjusted with respect to a reagents consumption rate, thereby maintaining a constant dilution of the reagents in the reaction chamber of the fuel cell.

14. A method as claimed in claim 10, wherein the concentration of raw mixtures is known, and the inlet mixtures having a dilution value equal to, or lower than, maximum dilution value/s are prepared by removing reagents and/or diluents from the raw mixtures, subtraction of said reagents and/or diluents being carried out outside the reaction chamber of the fuel cell by a physical or chemical method.

15. A method as claimed in claim 10, wherein the concentration of raw mixtures is known, and the inlet mixtures having a dilution value equal to, or lower than, said maximum dilution value/s are prepared by removing reagent(s) and/or diluent(s) from the raw mixtures, the subtraction of said reagent(s) and/or diluent(s) being carried out inside the reaction chamber of the fuel cell by a physical or chemical method.

16. A method as claimed in claim 1, wherein said current density is established or adjusted on the base of the permeability of the gas diffusion layers, the conductivity of the electrodes or the electrolyte concentration.

17. A method of controlling a fuel cell as claimed in claim 1, wherein during said step of checking and adjusting the dilution gradient of the reagents along all of the active surfaces, said dilution gradient is kept as close as possible to zero.

18. A method of evaluating the electric efficiency of a fuel cell comprising the following steps:
    arranging a circuit including a fuel cell and a resistor electrically connected with said fuel cell,
    supplying said circuit with reagents having known dilution;
    evaluating a reference electric efficiency for the fuel cell supplied with said reagents having known dilution;
    evaluating the reference voltage drop across the resistor;
    changing the dilution of at least one reagent;
    changing the resistance of the resistor until a voltage drop across the resistor equal to the reference voltage drop is obtained; and
    evaluating the electric efficiency of the fuel cell on the base of the reference electric efficiency of the fuel cell, of the dilution of the reagents to be fed to the fuel cell before and after changing the dilution of the at least one reagent, and on the base of the ratio of resistor resistances before and after changing the resistance of the resistor.

19. A method of evaluating the electric efficiency of a fuel cell comprising the following steps:
    arranging a first fuel cell, whose electric efficiency is to be determined, in electrical connection with a first resistor of known resistance value, thereby obtaining a first circuit;
    arranging a second circuit including a second fuel cell identical to the first fuel cell, and a second resistor electrically connected with the second fuel cell,
    supplying the first and the second circuit with reagents having a known dilution or known dilutions;
    evaluating the electric efficiency of the second fuel cell on the base of its respective reagent dilution or reagent dilutions;
    evaluating the voltage drop across the resistor of the first and of the second circuit;
    keeping the second resistor (R1) at a predetermined value and varying the first resistor (RA) until the same voltage drop across the resistor of the first and the second circuit is obtained, thereby determining a first resistor value; and
    evaluating the electric efficiency of the first fuel cell on the base of the electric efficiency of the second fuel cell, of the reagent dilution(s) to be fed to the fuel cell, and on the base of the ratio of the first resistor value to the second resistor predetermined value.

20. A fuel cell suitable for obtaining an electric power output comprising:
    a casing in which an intermediate space is delimited between a cathodic space and an anodic space;
    at least one electrolytic material located in said intermediate space;
    a positive electrode electrically connected to the end of said electrolytic material at the cathodic space;
    a negative electrode electrically connected to the end of the electrolytic material at the anodic space;
    an oxidant inlet mixture in fluid communication with said cathodic space; and
    a reducing inlet mixture in fluid communication with said anodic space, characterized in that it comprises control means of the electric efficiency of said fuel cell including means suitable for checking and/or adjusting the current density produced in the fuel cell per unit of active surface area.

21. A fuel cell as claimed in claim 20, wherein said means suitable for checking the current density comprises means suitable for checking the dilution value of the oxidant inlet mixture and/or reducing inlet mixture of the fuel cell.

22. A fuel cell as claimed in claim 20, further comprising means for checking the dilution or dilutions of the oxidant inlet mixture and/or reducing inlet mixture used to fuel the reaction that will occur in said fuel cell; means for comparing the checked dilution or dilutions with a desired maximum dilution value; and means for controllably increasing or decreasing the dilution of said oxidant inlet mixture and/or reducing inlet mixture, thereby decreasing or increasing the electric efficiency of said fuel cell.

23. A fuel cell as claimed in claim 20, further comprising means for varying the electric efficiency including means for increasing or decreasing the current density.

24. A fuel cell as claimed in claim 23, wherein said means for increasing or decreasing the current density comprises means for adding or subtracting reagents or diluents either already available in, or before or while being fed to, the cathodic and/or anodic space of said fuel cell.

25. A fuel cell as claimed in claim 20, further comprising means for checking and adjusting a dilution gradient of the oxidant inlet mixture and/or reducing inlet mixture along all active surfaces of the electrodes, which maintains a constant and null dilution gradient of the oxidant inlet mixture and/or reducing inlet mixture along all of the active surfaces of the electrodes.

26. A fuel cell as claimed in claim 20, further comprising means for checking and adjusting the dilution gradient of the reagents along all of the active surfaces of the electrodes, which comprises a mixer located in said cathodic and/or anodic space for maintaining the oxidant inlet mixture and/or reducing, inlet mixture, in a desired turbulent motion condition.

* * * * *